United States Patent [19]

Berry

[11] 3,886,628

[45] June 3, 1975

[54] OYSTER SHUCKER AND METHOD
[75] Inventor: Robert J. Berry, Lake Hiawatha, N.J.
[73] Assignee: Lawrence J. Maher, Lake Hiawatha, N.J. ; a part interest
[22] Filed: Jan. 11, 1974
[21] Appl. No.: 432,747

[52] U.S. Cl. .................................................. 17/76
[51] Int. Cl. ........................................... A22c 29/00
[58] Field of Search ............................ 17/74, 75, 76

[56] References Cited
UNITED STATES PATENTS
98,102   12/1869   Pottberger .............................. 17/75
2,808,613   10/1957   Palmere ................................. 17/76
2,942,292   6/1960   Roy ........................................ 17/76

Primary Examiner—Robert Peshock
Attorney, Agent, or Firm—Paul & Paul

[57] ABSTRACT

A mechanical oyster shucker which compressively impales an intact oyster shell upon a pair of knife blades, one of which is adapted to sever the hinge of the oyster shell and then be withdrawn, the other of which is adapted to scrape the oyster away from one inner shell wall, is disclosed.

24 Claims, 6 Drawing Figures

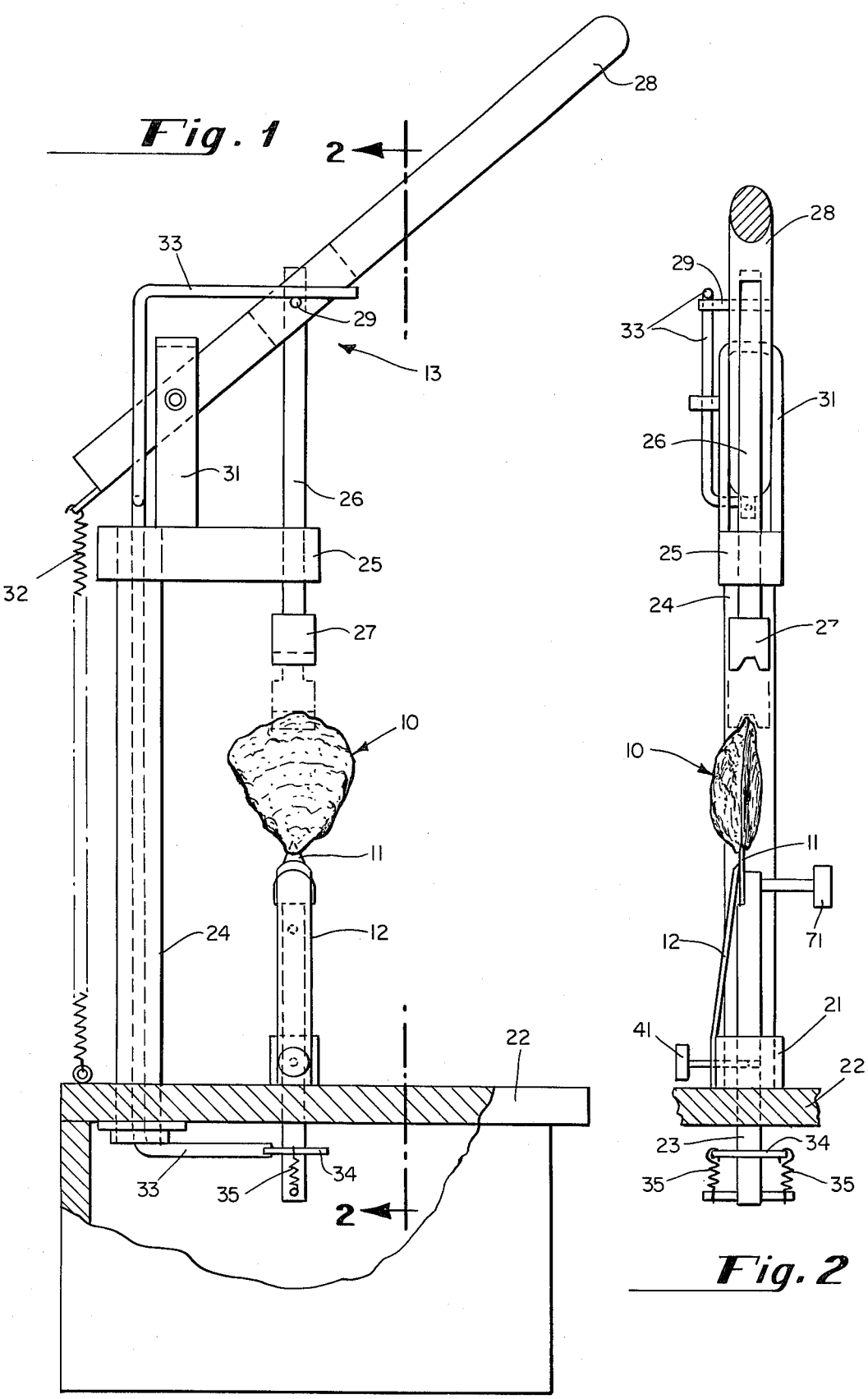

OYSTER SHUCKER AND METHOD

BACKGROUND OF THE INVENTION

This invention relates to the opening of the shells of members of the bivalve mollusk family of invertebrates, and more particularly to the opening of intact oyster shells so that the oyster within may be removed or served in the half shell.

Oyster shucking, the opening of oyster shells in order to remove the oyster, is almost exclusively done manually today. The successful manual opening of oysters requires a great deal of skill and dexterity, and can only be done safely and efficiently by highly-trained, well-experienced people. Necessarily, the degree of skill required results in a high labor cost to opening oysters, which is eventually passed on to the consumer. For an oyster packaging plant, the availability of a mechanical means of opening oysters would significantly lower the labor costs. For the enumerable restaurants which serve oysters, the availability of a mechanical oyster shucker would decrease the amount of time spent opening oysters by the relatively unskilled personnel available to such restaurants and thereby decrease the labor cost to the consumer in that respect.

Another aspect of the manual opening of oyster shells is its inherent dangerousness. The probability of loss of, or damage to, the fingers of the person opening the oysters manually is quite high, since a sharp blade must be used with great force in order to sever the extremely hard hinge of the oyster which holds together the two halves. A mechanical means of opening oysters which removes the operator's hands from the immediate area of contact between a blade severing the oyster and the oyster shell would reduce safety problems immeasurably in this area.

SUMMARY OF THE INVENTION

Accordingly, it is among the objects of this invention to provide non-manual means for opening oyster shells or the shells of other bivalved mollusks, thereby reducing the labor cost involved in opening oysters and also decreasing the dangerousness of such manual opening.

These and other objects of the invention are obtained with an oyster shucker which comprises a pair of knife blades and compressive force means. The first blade of the pair of knife blades is adapted to sever the hinge of an intact oyster shell which is being impaled upon it by the compressive force means. Immediately after the severing of the hinge, the first knife blade is adapted to be withdrawn from the severed-hinge oyster shell without removing the oyster shell from the compressive force means. The compressive force means then forces the severed-hinge oyster shell down onto the second knife blade of the pair of knife blades, which second knife blade operates to scrape the oyster within the shell away from one side of the oyster shell, thus resulting in the oyster being attached only to the other side; in which form it may be served, or from which the oyster itself may be easily removed.

BRIEF DESCRIPTION OF THE DRAWINGS

FIG. 1 is a partially-sectioned side view of a preferred embodiment of the present invention;

FIG. 2 is a sectioned end view of the preferred embodiment of FIG. 1, taken along the lines 2—2 of FIG. 1;

DESCRIPTION OF THE PREFERRED EMBODIMENTS

Figure 3:
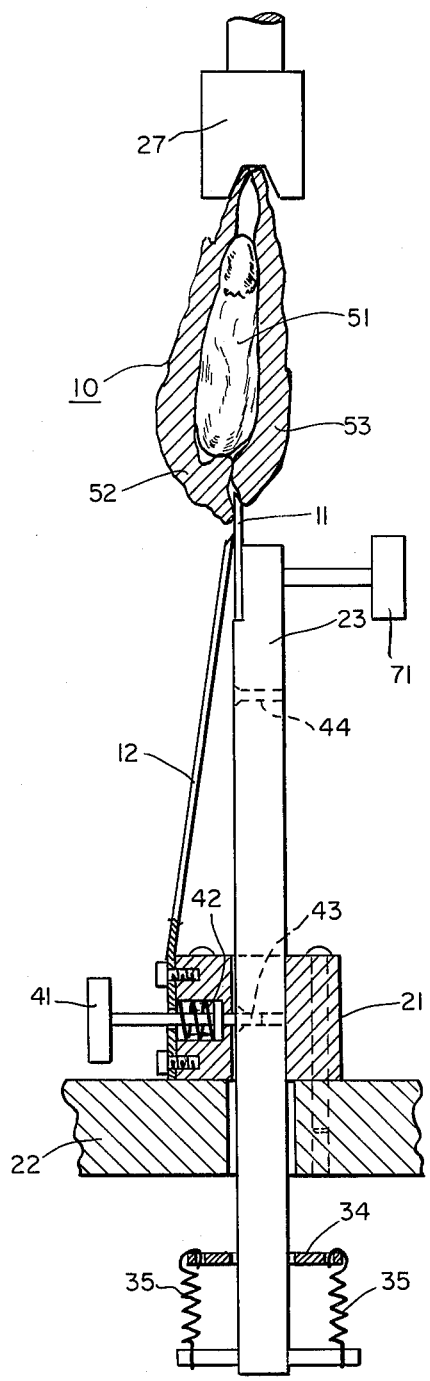
FIG. 3 is an enlarged sectioned end view of the preferred embodiment of the present invention; the oyster and oyster shell, and the blade-release mechanism being shown in section, at the moment when the first knife blade just begins to break the hinge of the oyster shell.
Figure 4:
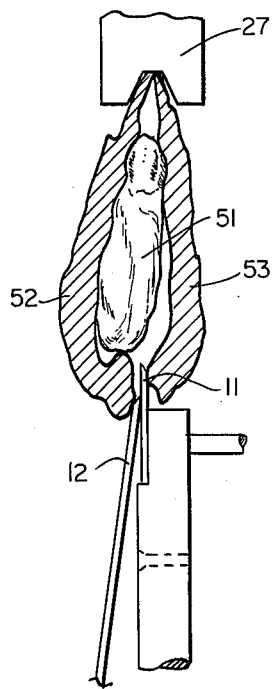
FIG. 4 shows the positioning of the knives just as the severing of the oyster shell hinge is being completed immediately before the withdrawal of the first knife blade.
Figure 5:
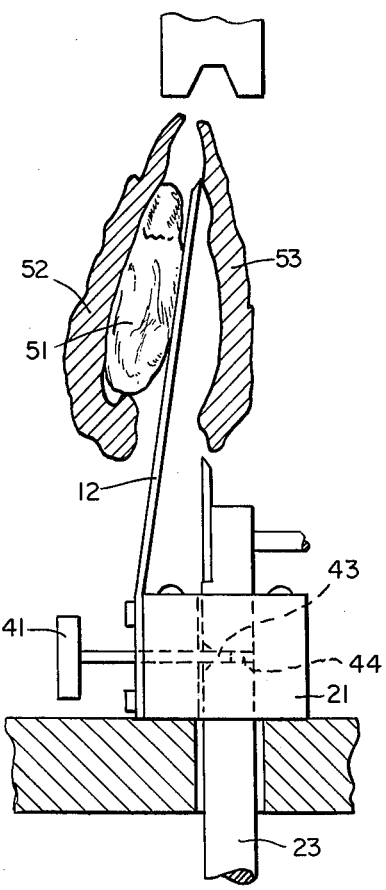
FIG. 5 shows the oyster shell after the first knife blade has been retracted and the second knife blade has almost completed scraping the oyster away from one inner wall of the shell.
Figure 6:
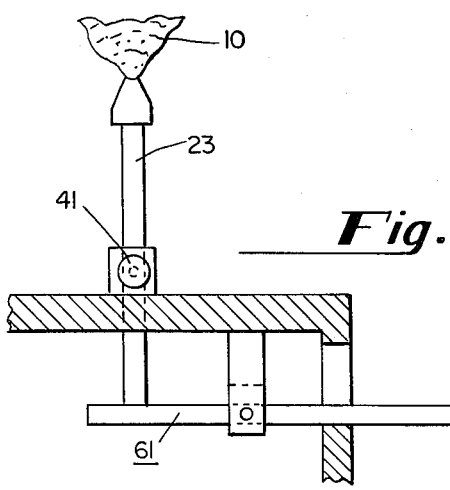
FIG. 6 shows a vertical cross-section of an alternative embodiment utilizing a manual return of the anvil.

Referring to the figures, FIG. 1 shows the preferred embodiment of the present invention. Basically, an intact oyster shell 10 is forced by a compressing means 13 onto a pair of knife blades 11 and 12 substantially simultaneously as shown in FIG. 4. An anvil post 21 is firmly attached to a base 22. Attached to anvil post 21 is second knife blade 12, a scraping blade. Retractable anvil 23 is slidingly disposed through anvil post 21 and base 22 and has a portion beneath the base 22. Attached to the top of anvil 23 is first knife blade 11, usually of a ground-tip, mechanically sharpened construction. Also attached to the top of anvil 23 is anvil assist knob 71 which can be utilized to manually adjust the vertical position of anvil 23 when desired. Hollow base shaft 24 is attached to and disposed through base 22 and rises to a point above knife blades 11 and 12. Hollow base shaft 24 terminates at its intersection with compressive shaft guide 25 through which compressing movable shaft 26 is slidingly disposed. Compressive shaft guide 25 may be pivotable horizontally on hollow base shaft 24 so that compressing movable shaft 26 may be laterally positioned to best advantage for each oyster shell. At the lower end of compressing movable shaft 26 is attached oyster holder 27 which is usually adjustable. The top of compressing movable shaft 26 is attached to handle 28 by a pin 29. Handle 28 is pivoted at one end to pivot bar 31 which is affixed to compressing shaft guide 25. The end of handle 26 is connected by a handle spring 32 to the base 22, which spring retains handle 28 and therefore compressing shaft 25 in a normal upward position. Supported by pin 29 is anvil return rod 33 which is forced to move upwardly through hollow base shaft 34 with compressible shaft 26 by pin 29. When shaft 26 moves downwardly, pin 29 no longer supports anvil return rod 33 and rod 33 is then free to fall under the force of gravity. At its other end anvil return rod 33 terminates in an annular connector ring 34 which surrounds the bottom of anvil 23. Annular connector ring 34 is connected to anvil 23 by means of springs 35 which are attached either directly to anvil 23 or to a pin disposed through the bottom part of anvil 23. As seen in FIG. 3, anvil drop pin 41 is disposed through anvil post 21, and is retained in a normally inward position by anvil drop pin spring 42. Anvil pin slots 43 and 44 are positioned such that in its upward or in its withdrawn position anvil 23 is held in place by that portion of anvil drop pin 41 which projects into pin slots 43 or 44. FIG. 6 shows an alternate embodiment in which the anvil is returned manually by means of a pivoted lever.

Operation

When handle 28 is depressed, movable shaft 26 moves downward and oyster holder 27 on the end of movable compressive shaft 26 forces oyster shell 10 onto knife blades 11 and 12. As movable compressive shaft 26 goes downward anvil return rod 33 is no longer supported by pin 29 and is therefore free to drop under the effect of gravity along with anvil 23 whenever anvil drop pin 41 is retracted. When anvil drop pin 41 (which may also alternatively be operatively connected to a release mechanism located on the handle so that only one hand is required for operation) is released anvil 23 drops through anvil post 21 and base 22 until upper pin slot 44 is retained by anvil drop pin 41, which retains the anvil in this lower position until second knife blade 12, the scraping blade, scrapes the oyster 51 away from the inner wall of flat side 53 of oyster shell 10. Alternatively, scraping blade 12 can be adapted to scrape oyster 51 away from bowl side 52 of oyster shell 10. At this point, handle 28 is released and handle spring 32 pulls it and movable shaft 26 back into an upright position, also pulling upward anvil return rod 33 thereby exerting tension on springs 35. When anvil return pin 41 is retracted again, anvil 23, propelled by the tension of springs 35, pops upward through base 22 and anvil post 21 to return to its normal upright position where it is locked in place by anvil drop pin 41 locking in position into the lower pin slot 43. Thus the cycle is completed and the apparatus is ready for the shucking of another oyster. With the alternate embodiment shown in FIG. 6, anvil 23 is returned by the manual operation of lever 61 and anvil return rod 33 is eliminated.

It will be apparent from the foregoing that various other modifications may be made in the details of construction, use, and operation of the invention, and yet still be within the spirit and scope of the present invention as defined in the following claims.

What is claimed is:

1. An oyster shucker, comprising: a pair of knife blades, a first blade of said pair being adapted to sever the hinge of an intact oyster shell, the second blade of said pair being adapted to scrape an oyster away from one inner wall of a severed-hinge oyster shell; and movable compressive force means for compressively forcing an oyster shell upon said pair of knife blades; said movable compressive force means being positioned with respect to said pair of blades and said oyster shell so as to force both of said blades to engage and enter said oyster shell and cause said first blade to sever the hinge of said shell and said second blade to scrape said oyster away from said inner wall, upon movement of said compressive force means toward said pair of blades.

2. A method of shucking oysters, comprising the steps of:
   positioning an intact oyster shell between a movable force means and a pair of knife blades, a first blade of said pair being adapted to sever the hinge of an intact oyster shell, the second blade of said pair being adapted to scrape an oyster away from one inner wall of a severed-hinge oyster shell;
   severing the hinge of the intact oyster shell by moving said means toward said pair of blades and forcing said shell upon the first blade of said pair by means of said compressive force means; and
   continuing to move said means and
   scraping the oyster away from one inner wall of the severed-hinge oyster shell by forcing the severed-hinge oyster shell onto the second blade by means of the compressive force means.

3. An oyster shucker, comprising: a base; an anvil post attached to said base; a scraping blade attached to said post; a retractable anvil retractable through said post and said base; an anvil-drop pin, operatively connected to said anvil; an anvil-drop pin spring, which retains said anvil-drop pin in a normal non-dropping position; a plurality of pin slots in said anvil, by which said anvil is retained by said anvil-drop pin; a ground-tip anvil blade, attached to said anvil; a hollow base shaft connected to said base; a compressive shaft guide connected to the end of said hollow base shaft opposite said base; a pivot bar connected to said compressing shaft guide; a pivoting handle, pivoted on the end of said pivot bar opposite the end at which said pivot bar is connected to said compressing shaft guide; a compressing shaft attached to said pivoting handle and slidingly positioned through said compressing shaft guide; an oyster holder attached to the end of said compressing shaft opposite the end at which said compressing shaft is attached to said pivoting handle; a handle spring connected between said handle and the end of said hollow base shaft nearest said base; an annular connector ring disposed about that portion of said retractable anvil which is positioned beneath said base; an anvil return rod, connected at one end to said compressing shaft, movingly disposed within said hollow base shaft, and connected at its other end to said connector ring; and a plurality of connector ring springs, connected at one end to said connector ring, and connected at their other end to that portion of said retractable anvil disposed beneath said connector ring.

4. An oyster shucker according to claim 3, wherein said anvil-drop pin is actuated by anvil-drop-pin-actuating means positioned on said handle such that for manual operation of said oyster shucker, said anvil-drop pin may be actuated by the thumb of the hand which operates said handle.

5. An oyster shucker according to claim 1, wherein said compressive force means comprises a movable shaft slidingly disposed within a shaft guide, said shaft being connected to a pivoted handle.

6. An oyster shucker according to claim 5, wherein said first knife blade is mounted on an end of a retractable anvil, and wherein said knife blade is withdrawn from said oyster immediately after the severing of the hinge by means of an anvil-drop pin retractably engaged with said anvil.

7. An oyster shucker according to claim 1, wherein the edge of said first knife blade is of a mechanically sharpened construction.

8. An oyster shucker according to claim 1, wherein said compressive force means is non-manually actuated.

9. An oyster shucker according to claim 8, wherein said compressive force means comprises a motor, a cam to which said motor is operatively connected, and a movable shaft operatively connected to said cam.

10. An oyster shucker according to claim 1, wherein said oyster shucker is adapted to utilize mechanical vibratory movement to assist in the shucking of oysters.

11. An oyster shucker according to claim 3, wherein said oyster holder is adjustable.

12. An oyster shucker according to claim 1, wherein said second blade is adapted to scrape the oyster away from the bowl-shaped wall of the oyster.

13. An oyster shucker according to claim 1, wherein said second blade is adapted to scrape the oyster away from the non-bowl-shaped wall of the oyster.

14. An oyster shucker according to claim 1, wherein said first knife blade is adapted to be withdrawn by means of a manually-operated pivoted lever connected to a retractable anvil upon which said first knife blade is mounted.

15. An oyster shucker according to claim 3, wherein said compressing shaft guide is pivotable about said hollow base shaft, so as to provide for adjustable lateral positioning of said compressing shaft with respect to each oyster shell to be shucked.

16. An oyster shucker, comprising: a pair of knife blades, a first blade of said pair being adapted to sever the hinge of an intact oyster shell, the second blade of said pair being adapted to scrape an oyster away from one inner wall of a severed-hinge oyster shell; compressive force means for compressively forcing an oyster shell upon said pair of knife blades; said first knife blade being adapted to be withdrawn from the oyster shell immediately after the severing of the hinge without removing the oyster shell from the compressive force means, the compressive force means being adapted to force the oyster shell onto the second blade as the first blade is withdrawn; wherein said compressive force means comprises a movable shaft slidingly disposed within a shaft guide, said shaft being connected to a pivoted handle; further comprising an anvil return rod connected at one end to said movable shaft and at its other end to tension means, said tension means being connected to said anvil such that when said movable shaft is moved toward or away from said anvil, said anvil return rod through said tension means exerts tension upon said anvil causing said anvil to move in the same direction as said movable shaft when said anvil-drop pin is retracted from engagement with said anvil.

17. An oyster shucker according to claim 16, wherein said tension means comprises an annular connector ring disposed about the end of said anvil farthest from said movable shaft;

said annular connector ring being connected on its outer periphery to said anvil return rod, and being connected by a plurality of spring means to said farthest end of said anvil.

18. An oyster shucker, comprising: a pair of knife blades, a first blade of said pair being adapted to sever the hinge of an intact oyster shell, the second blade of said pair being adapted to scrape an oyster away from one inner wall of a severed-hinge oyster shell; compressive force means for compressively forcing an oyster shell upon said pair of knife blades; said first knife blade being adapted to be withdrawn from the oyster shell immediately after the severing of the hinge without removing the oyster shell from the compressive force means, the compressive force means being adapted to force the oyster shell onto the second blade as the first blade is withdrawn; wherein said compressive force means comprises a movable shaft slidingly disposed within a shaft guide, said shaft being connected to a pivoted handle; wherein said first knife blade is mounted on an end of a retractable anvil, and wherein said knife blade is withdrawn from said oyster immediately after the severing of the hinge by means of an anvil-drop pin retractably engaged with said anvil; further comprising an anvil-drop pin spring; and a plurality of pin slots in said anvil; said drop pin, said spring, and said slots adapted to automatically retain said anvil in an alternate position after said drop pin has been retractably momentarily disengaged from said anvil.

19. A method according to claim 2, wherein the compressive force applied to the oyster by the compressive force means is greater than that capable of being applied solely manually.

20. An oyster shucker, comprising: a co-acting pair of knife blades, a first blade of said pair being adapted to sever the hinge of an intact oyster shell, the second blade of said pair being adapted to scrape an oyster away from one inner wall of a severed-hinge oyster shell; compressive force means for compressively forcing an oyster shell upon said pair of knife blades substantially simultaneously, the forward edge of the first blade of said pair of knife blades being positioned slightly beyond the forward edge of the second blade of said pair of knife blades, so as to have the first blade contact the oyster shell prior to the second blade; said first knife blade being adapted to be withdrawn from the oyster shell after the severing of the hinge without removing the oyster shell from the compressive force means, the compressive force means being adapted to force the oyster shell onto the second blade as the first blade is withdrawn.

21. The invention of claim 1, wherein said knife blades are disposed within said oyster shell substantially simultaneously.

22. The invention of claim 21, wherein said first knife blade is adapted to be withdrawn from said oyster shell after severing said hinge, without removing said shell from said compressive force means.

23. The invention of claim 1, wherein said blades are positioned with respect to said compressive force means and said oyster shell so that said first blade engages said shell prior to said second blade.

24. The invention of claim 2, wherein the additional step of withdrawing said first blade from said oyster shell while said second blade remains therein.

* * * * *